United States Patent [19]

Abbott et al.

[11] 3,860,709

[45] Jan. 14, 1975

[54] METHOD OF INHIBITING THE GROWTH OF BACTERIA AND FUNGI USING ORGANOSILICON AMINES

[75] Inventors: Eugene A. Abbott, Freeland; Alan J. Isquith, Midland, both of Mich.

[73] Assignee: Dow Corning Corporation, Midland, Mich.

[22] Filed: Nov. 8, 1973

[21] Appl. No.: 414,058

Related U.S. Application Data

[62] Division of Ser. No. 184,918, Sept. 29, 1971, Pat. No. 3,794,736.

[52] U.S. Cl. ............................................. 424/184
[51] Int. Cl. ........................... A01n 9/20, A01n 9/24
[58] Field of Search .............................. 424/184, 78

[56] References Cited
UNITED STATES PATENTS

| | | | |
|---|---|---|---|
| 2,832,754 | 4/1958 | Jex et al............................ | 260/46.5 |
| 2,930,809 | 3/1960 | Jex et al............................ | 260/448.8 |
| 2,971,864 | 2/1961 | Speler................................ | 117/124 |
| 3,658,867 | 4/1972 | Prokal............................... | 260/448.2 |

OTHER PUBLICATIONS

Maki et al., Yukagaku 19 (II) Nov. 1970.

*Primary Examiner*—Albert T. Meyers
*Assistant Examiner*—Allen J. Robinson
*Attorney, Agent, or Firm*—Norman E. Lewis

[57] ABSTRACT

The growth of bacteria and fungi are inhibited by contacting the organisms with certain organosilicon amines and their corresponding amine salts. Specifically the compound $[(CH_3)_3SiO]_3Si(CH_2)_3NHCH_2CH_2NH_2$ kills S. aureus, E. coli, A. niger and P. aeruginosa at an M.I.C. of 100 ug/ml or less.

2 Claims, No Drawings

METHOD OF INHIBITING THE GROWTH OF BACTERIA AND FUNGI USING ORGANOSILICON AMINES

This is a division, of application Ser. No. 184,918, filed Sept. 29, 1971 now U.S. Patent No. 3,794,736.

It is known from U.S. Pat. No. 2,930,809 that dialkoxymethylsilylbutylamines of the formula

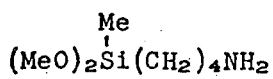

are toxic and the patent states, col. 3, line 69;

"The compounds of our invention, particularly the dialkoxymethylsilylbutylamines, unlike their homologs referred to above, are extremely poisonous and find wide utility in the preparation of pesticides, fungicides, insecticides and herbicides as is hereinafter set forth." Col. 8, line 12, states;

"Based on quantitative data, delta-aminobutylone ethyldiethoxysilane is poisonous to animals such as rabbits and the like by means of skin absorption."

The "homologs referred to above" are shown in col. 3, line 45, to be alkoxysilylpropylamines and alkoxysilylmethylamines.

Applicants have found contrary to this teaching that silylpropylamines of this invention are excellent bactericides and fungicides both in solution and when applied to the surfaces of solid objects as shown below.

Also Maki et al Yukagaku 19(11) Nov. 1970, 1029-33; CA 74(8), 32907v. show that $Bu_3Si(CH_2)_3$-$NMe_2 \cdot HCl$ kills S. aureus 209P and E. coli B.

This invention relates to a method of inhibiting the growth of bacteria and fungi by contacting said organisms with an effective amount of an organosilicon amine of the formula (1) 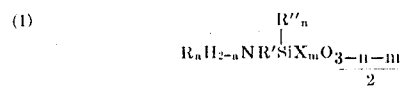

and (2) 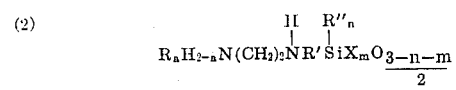

in which
R is a monovalent hydrocarbon radical of from 1 to 20 carbon atoms,
R' is $-(CH_2)_3-$ or $-CH_2CH(CH_3)CH_2-$,
X is an alkoxy radical of 1 to 6 carbon atoms,
R'' is a monovalent hydrocarbon radical of 1 to 6 carbon atoms, the $CF_3CH_2CH_2-$ radical or an OH radical,
a is an integer from 0 to 2,
n is an integer of 0 to 2 and
m is an integer from 0 to 3 and copolymers containing at least 5 mol percent total (1) and (2) siloxane units in which the sum of
n + m is not greater than 2, the remaining siloxane units in said copolymers being of the formula $R'''_bSiO_{(4-b)/2}$ in which
R''' is a hydrocarbon radical of 1 to 6 carbon atoms, the $CF_3CH_2CH_2-$ radical or the OH radical and
b is an integer from 0 to 3 and acid salts of said amines in which at least one of the amine nitrogens is converted to a salt of the formula $\equiv$ N.HY in which
Y is an anion of a monocarboxylic acid, a strong mineral acid or a sulfonic acid.

The amines employed herein can be silanes or siloxanes. Since the X groups hydrolyze in the presence of moisture at room temperature the active species is probably the corresponding silanol or siloxane. With respect to the siloxane or silanols they can be homopolymers or copolymers in which each silicon has an amino group attached thereto through the R' linkage or the siloxane can be copolymers containing one or more types of units (1) and/or (2) and siloxane units of the formula $R'''_bSiO_{(4-b)/2}$. To be effective the latter copolymers should contain at least 5 mol percent aminosiloxane units.

The compounds employed in this invention are well known materials appearing in numerous publications and patents. They are sold extensively through commercial channels. Briefly, however, they can be prepared by reacting the corresponding chloroalkylsilanes or siloxanes with ammonia or the corresponding amines, i.e.,

The compositions of this invention can be used in any convenient form, that is, per se or as a solution. The effective concentration of the compositions varies from amine to amine and from organism to organism. However, most of the compounds are effective against most organisms at a M.I.C. of from 1,000 ug/ml or less.

The compositions of this invention are effective against gram-negative and gram-positive bacteria, as well as a wide variety of fungi and yeast. The extent of this activity is illustrated in the examples shown below.

For the purpose of the invention, R can be any monovalent hydrocarbon radical of from 1 to 20 carbon atoms such as alkyl radicals such as methyl, ethyl, isopropyl, or octadecyl; alkenyl radicals such as allyl, hexenyl or octadecenyl; cycloaliphatic hydrocarbon radicals such as cyclopentyl, cyclohexyl, cyclohexenyl or methylcyclohexyl; aromatic hydrocarbon radicals such as phenyl, tolyl, naphthyl, or xyly-; and aralkyl hydrocarbon radicals such as benzyl, beta-phenylethyl, beta-phenylpropyl, para-vinylphenylmethyl and paramethylbenzyl radicals.

R'' and R'''' can independently be any monovalent hydrocarbon radical of from 1 to 6 carbon atoms such as methyl, ethyl, isopropyl, butyl, hexyl, phenyl or cyclohexyl; and X can be any alkoxy radical such as methoxy, ethoxy, isopropoxy, hexyloxy, beta-methoxyethoxy or beta-ethoxyethoxy.

The amine salts useful in this invention can be those in which each amino nitrogen has been converted to a salt or where only some of the amino nitrogens have been converted to a salt. The salts operative herin can be those of monocarboxylic acids such as formic, acetic, propionic, hexanoic, octanoic, acrylic and methacrylic. The salts can also be those of strong mineral acids such as hydrochloric, hydrobromic, hydroiodic, sulfuric, phosphoric or nitric; or of sulfonic acids such as benzene sulfonic, toluene sulfonic, xylene sulfonic or butyl sulfonic.

As can be seen in those cases in which the amine group on the silicon is represented by Z the compounds of this invention can have the following general formulae, $ZSiX_3$, $ZSiR''X_2$, $ZSiR''_2X$, $ZSiX_2O_{.5}$, $ZSiXO$, $ZSiR''O$, $ZSiO_{3/2}$, $ZSiR''_2O_{.5}$, $ZSiR''XO_{.5}$ and copolymers of the above with $R'''_3SiO_{.5}$, and $R'''SiO_{1.5}$ and $SiO_2$ units.

The compositions of this invention are useful in a wide variety of applications. They not only kill bacteria in solution, but also on surfaces. As is well known siloxanes and silanes, particularly those having trifunctional silicon atoms can be tenaciously attached to a wide variety of surfaces from which it is difficult or impossible to remove them by repeated washings. Thus, the compositions of this invention of such a nature are excellent for treating a wide variety of surfaces to render them more or less permanently bacteriostatic or fungistatic. This can be done by applying the silane or siloxane to the surface where it will cure and render that surface anti-microbial. If desired, the substrate can be heated to say 80° to 100°C to hasten the cure and more firmly affix the siloxane to the surface. The compositions of this invention can be useful in hospitals, nursing homes, clinics and the like, as well as in toilets and bathrooms for sterlizing or disinfecting a wide variety of surfaces and instruments.

The compositions are effective on such surfaces as ceramic, wood, paper, leather, organic fabrics, glass, metal and other materials.

The following examples are illustrative only and should not be construed as limiting the invention which is properly delineated in the appended claims. In the examples the following abbreviations are used; Me for methyl, Ph for phenyl, Et for ethyl, Vi for vinyl and Bu for butyl.

EXAMPLE 1

The efficacy of the compound of this example and of those shown below, unless otherwise stated, was determined by the standard serial tube dilution test described in "Microbiology" by M. J. Pelczar and R. D. Reid (1958), published by McGraw Hill Company. The minimum inhibitory concentration M.I.C. is expressed in ug/ml i.e. ppm.

The compound employed in this example was $(Me_3SiO)_3Si(CH_2)_3NHCH_2CH_2NH_2$. This amine was employed in the standard test shown above against the organisms shown below with the results shown below.

| Organism | M.I.C. ug/ml |
| --- | --- |
| S. aureus | 1 |
| C. ablicans | 100 |
| E. coli | 10 |
| P. aeruginosa | 10 |
| S. typhosa | 100 |
| M. phlei | 10 |
| T. mentagrophytes | 100 |
| B. subtilis | 100 |
| C. pelliculosa | 100 |
| A. aerogenes | 100 |
| P. pullulans | 100 |
| C. fragans | 100 |
| C. ips | 100 |
| Trichoderm sp., Madison p-42 | 100 |
| A. terreus | 500 |
| R. nigricans | 500 |
| A. niger | 100 |
| S. Cerevisiae | 10 |

EXAMPLE 2

Employing the procedure of Example 1 the following compound was found to be effective against the following organisms,

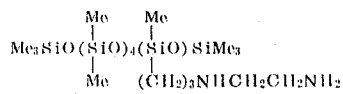

| Organisms | M.I.C. ug/ml |
| --- | --- |
| S. aureus | 500 |
| E. coli | 10 |
| S. typhosa | 500 |
| M. phlei | 500 |
| B. subtilis | 500 |
| C. fragans | 500 |
| Trichoderm sp. Madison p-42 | 500 |
| A. niger | 10 |
| S. cerevisiae | 10 |

EXAMPLE 3

The copolymer of the formula

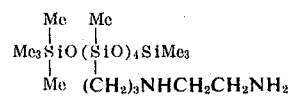

was found to be effective as follows:

| Organisms | M.I.C. ug/ml |
| --- | --- |
| S. aureus | 1,000 |
| E. coli | 10 |
| A. niger | 1,000 |
| S. cerevisiae | 1,000 |

EXAMPLE 4

The compound

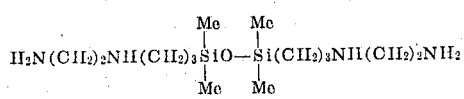

was found to be effective as follows:

| Organism | M.I.C. ug/ml |
| --- | --- |
| S. aureus | 100 |
| E. coli | 10 |
| A. niger | 100 |
| S. cerevisiae | 100 |

EXAMPLE 5

The copolymer

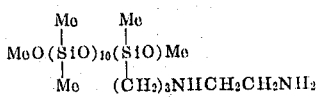

was found to be effective as follows:

| Organisms | M.I.C. ug/ml |
|---|---|
| S. aureus | 100,000 |
| E. coli | 100 |
| A. niger | 10,000 |
| P. aeruginosa | — |

EXAMPLE 6

The compounds shown below were tested as shown in Example 1 against the organisms shown below and the results shown below were obtained.

TABLE

| Compound | S. aureus | E. coli | A. niger | P. aeruginosa | S. cerevisiae |
|---|---|---|---|---|---|
| $(Me_3SiO)_3Si(CH_2)_3NMe_2$ | 100 | 1 | 10 | 10 | |
| $(Me_3SiO)_3Si(CH_2)_3NHMe$ | 10 | 10 | 10 | 10 | |
| $[OSi(Me)(CH_2)_3NMe_2]_x$ | 10,000 | 10 | 1,000 | 100 | 100 |
| $(EtO)_3Si(CH_2)_3NMe_2$ | 10,000 | 10,000 | 10,000 | | 10,000 |
| $PhMeSi(OH)(CH_2)_3NMe_2$ | 100 | 1,000 | 10,000 | 10,000 | |
| $(MeO)_3Si(CH_2)_3NEt_2 \cdot HCl$ | 10,000 | 10,000 | 10,000 | 10,000 | |
| $(MeO)_2Si(Me)(CH_2)_3NHMe$ | 1,000 | 1,000 | 1,000 | 1,000 | |
| $(MeO)_3Si(CH_2)_3NHMe$ | 100 | 1,000 | 10,000 | 10,000 | |
| $Me_3SiO[SiOMe_2]_5[SiO(Me)(CH_2)_3NH(Me)]SiMe_3$ | 10 | 100 | 1,000 | 100,000 | |
| $[MeN(H)(CH_2)_3Si(Me)O]_6$ | >100,000 | >100,000 | 1,000 | 1 | |
| $[MeN(H)(CH_2)_3Si(Me_2)]_2O$ | >100,000 | 1,000 | 100 | 1 | |
| $(MeO)_3Si(CH_2)_3NHBu$ | 10,000 | 1,000 | 10,000 | 10,000 | |
| $Me_3SiOSi(Me)(CH_2CHCH_2NHMe)(OH)$ (Me) | 100 | 0.01 | 10 | 0.01 | 10 |
| $(MeO)_3Si(CH_2)_3NHC_{12}H_{25} \cdot HCl$ | 100 | 10 | 1,000 | 10,000 | |
| $[PhSi(O)(CH_2)_3NH_2 \cdot HCl]_x$ | 1,000 | 1,000 | 100 | 1,000 | |
| $(MeO)_3Si(CH_2)_3N(H)(CH_2)_2NH_2$ | 10,000 | 1,000 | 10,000 | 1,000 | |
| $(MeO)_3Si(CH_2)_3N(H_2Cl)(CH_2)_2N(H_2Cl)-CH_2C_6H_4CH=CH_2$ | 100 | 1.0 | 1,000 | 100 | |
| $(MeO)_3Si(CH_2)_3NH(CH_2)_2N(H_2Cl)C_{18}H_{37}$ | 100 | 100 | 1,000 | 100 | |
| $(MeO)_3Si(CH_2)_3N(HCl)(CH_2)_2NHC_{12}H_{25}$ | 1,000 | 1,000 | 10,000 | 1,000 | |

EXAMPLE 7

The composition used in this example was a copolymer of 11 mol percent $NH_2(CH_2)_2NH(CH_2)_3SiO_{3/2}$ units and 88 mol percent dimethylsiloxy units, said copolymer having hydroxyl groups on the ends of the dimethyl chains and being in the form of the diacetate salt of the amine. The copolymer was applied to leather as a 2% by weight solution in water and isopropanol and the inhibitory effect of the treatment on the leather was determined in accordance with U.S. Military Standards Test 81 OB, Method No. 508. By this test the treatment inhibited the growth of the following fungi; A. niger, A. flavus, A. versicolor, P. funiculosum and C. globosum.

EXAMPLE 8

This example shows the efficacy on glass surfaces. A 1% by weight aqueous solutions of the amines shown below were applied to clean glass slides. After 30 min. the slides were oven dried at 90°C for 60 min. The treated slides were washed under running tap water (20°C) for 4 minutes, dried at 90°C for 30 min. and cooled to room temperature. The slides were then sprayed with a standardized fine mist of E. coli (active 24 hrs culture), placed in sterile petri dishes at 37°C for 24 hours. At the end of the incubation period the slides were stamped with Rodac agar plates to determine the number of viable organisms remaining on the surface of the glass slide. Other treated slides were washed under tap water and dried as shown above for the number of times shown below and the number of live organisms determined. The results are in the table below.

TABLE

| Amine | Number of Wash Cycles | | |
|---|---|---|---|
| | 1 | 5 | 10 |
| None | >1200 | >1200 | >1200 |
| (MeO)$_3$Si(CH$_2$)$_3$NH(CH$_2$)$_2$NH$_2$* | 5 | 2 | 2 |
| (EtO)$_3$Si(CH$_2$)$_3$NH(CH$_2$)$_2$NH$_2$ | 3 | 11 | 15 |

* In both cases the coating on the glass was a siloxane of the unit formula H$_2$NCH$_2$CH$_2$NH(CH$_2$)$_3$SiO$_{1.5}$ The test method comprises of using a commercial Rodac plate manufactured by the BBL division of Bio-Quest which in turn is a division of Becton, Dickinson and Company. The plate comprises of a plastic base on which is a four sq. in. raised agar bed. To test the surface one applies the agar bed directly to the incubated glass slides and holds it with a moderate vertical pressure. The plate is then removed from the surface, covered and incubated 48 hours at 35°C. The colonies of organisms on the surface are then counted.

EXAMPLE 9

Equivalent results are obtained when the following amines are used in the method of example 6.

(Me$_2$CHO)$_3$Si(CH$_2$)$_3$NH(CH$_2$)$_2$NHC$_6$H$_{11}$
(ViMe$_2$SiO)$_3$Si(CH$_2$)$_3$NHPh

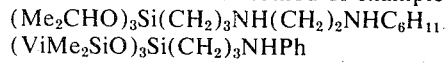

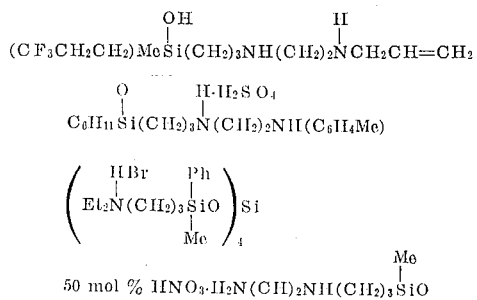

40 mol % MeBuSiO
10 mol % (C$_3$H$_5$)(C$_6$H$_9$)SiO
PhSO$_3$H.H$_2$N(CH$_2$)$_2$NH(CH$_2$)$_3$Si(OCH$_2$CH$_2$OMe)$_3$
C$_7$H$_{15}$COOH.H$_2$N(CH$_2$)$_3$Si(OSiMe$_3$)$_3$
CH$_2$=CHCOOH.MeHN(CH$_2$)$_3$Si(OSiMe$_3$)$_3$
10 mol % PhSiO$_{3/2}$
30 mol % MeSiO$_{3/2}$
40 mol % H$_2$N(CH$_2$)$_2$NH(CH$_2$)$_3$SiO$_{3/2}$

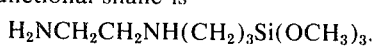

That which is claimed:

1. A method of inhibiting the growth of bacteria or fungi by contacting said organisms with an amount effective to inhibit the growth of said organisms of an amine-functional silane selected from the group consisting of (1) 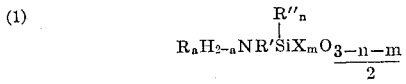

(2) 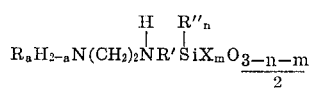

in which
R is a monovalent hydrocarbon radical of from 1 to 20 carbon atoms,
R' is —(CH$_2$)$_3$— or —CH$_2$CH(CH$_3$)CH$_2$—,
X is an alkoxy radical of 1 to 6 carbon atoms,
R'' is a monovalent hydrocarbon radical of 1 to 6 carbon atoms, the CF$_3$CH$_2$CH$_2$— radical or an OH radical,
a is an integer from 0 to 2,
n is an integer from 0 to 2,
m is an integer from 0 to 3, and the sum of $m + n$ is equal to 3;
and (3) acid salts of said amines in which at least one of the amine nitrogens is converted to a salt of the formula ≡N.HY in which
Y is an anion of a monocarboxylic acid, a strong mineral acid or a sulfonic acid.

2. The method of claim 1 in which the amine-functional silane is

H$_2$NCH$_2$CH$_2$NH(CH$_2$)$_3$Si(OCH$_3$)$_3$.

* * * * *